July 30, 1968 P. A. LIBERTI 3,395,093
CENTRIFUGAL CHROMATOGRAPHY AND ELECTROPHORESIS DEVICE
Filed Sept. 27, 1967 6 Sheets-Sheet 3

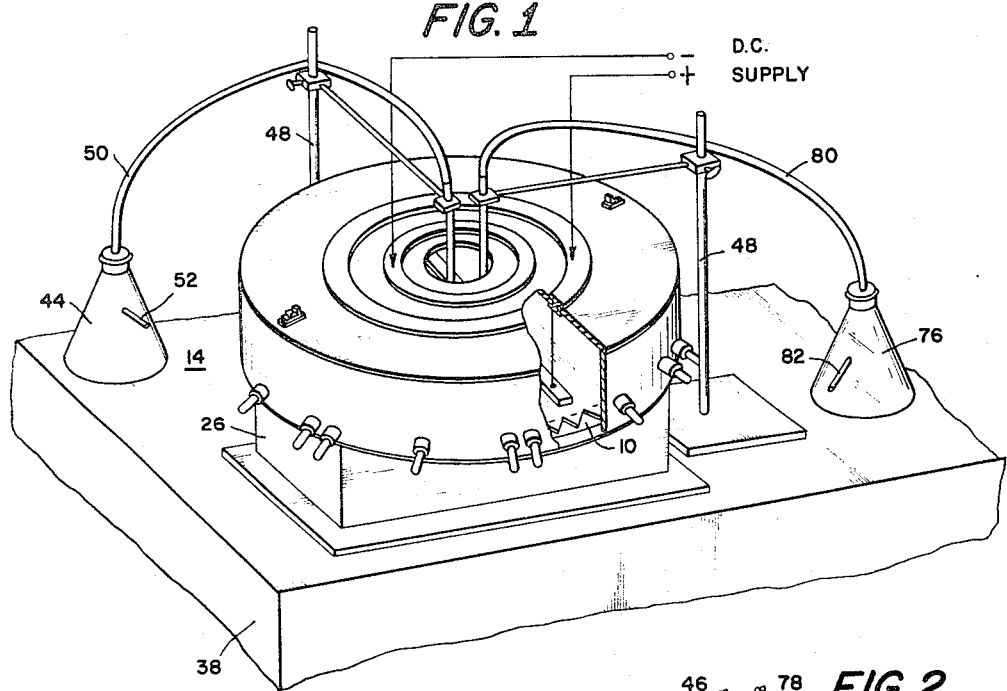
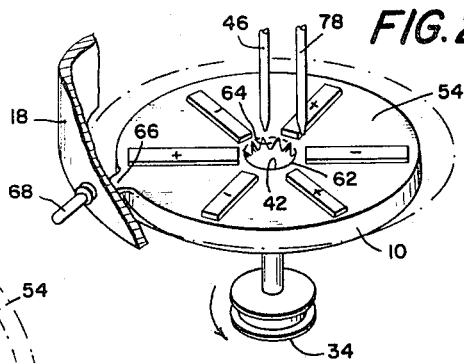
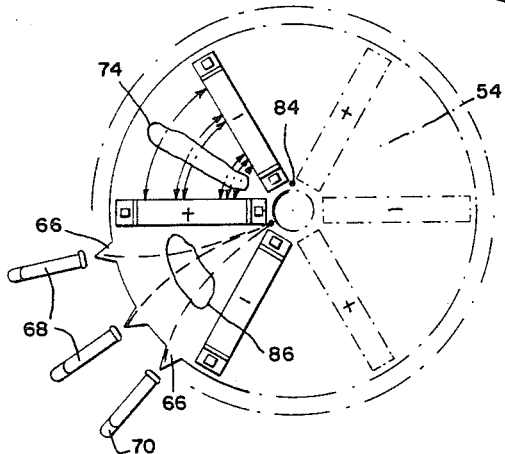

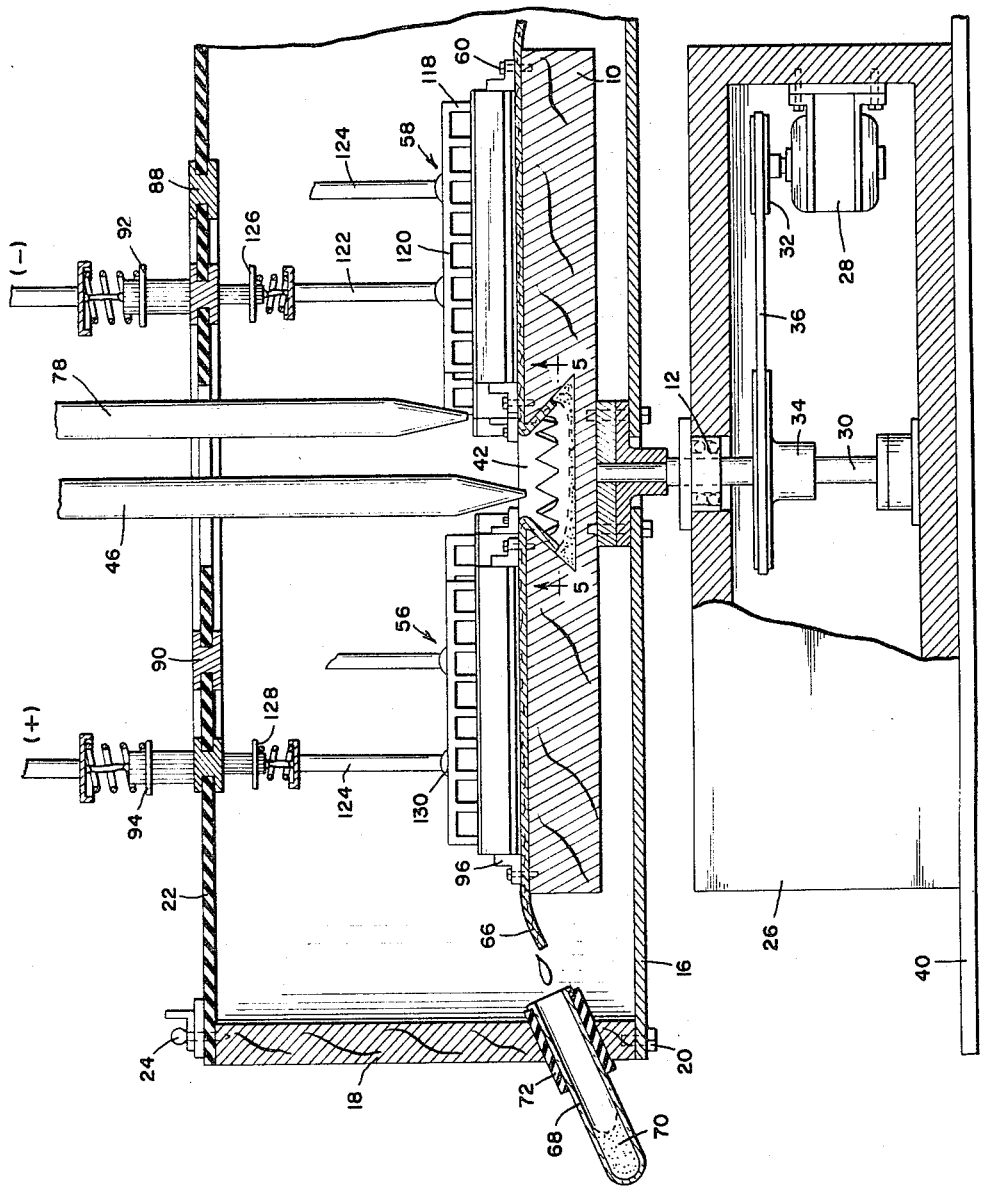

INVENTOR
PAUL A. LIBERTI

BY Stowell & Stowell
ATTORNEY

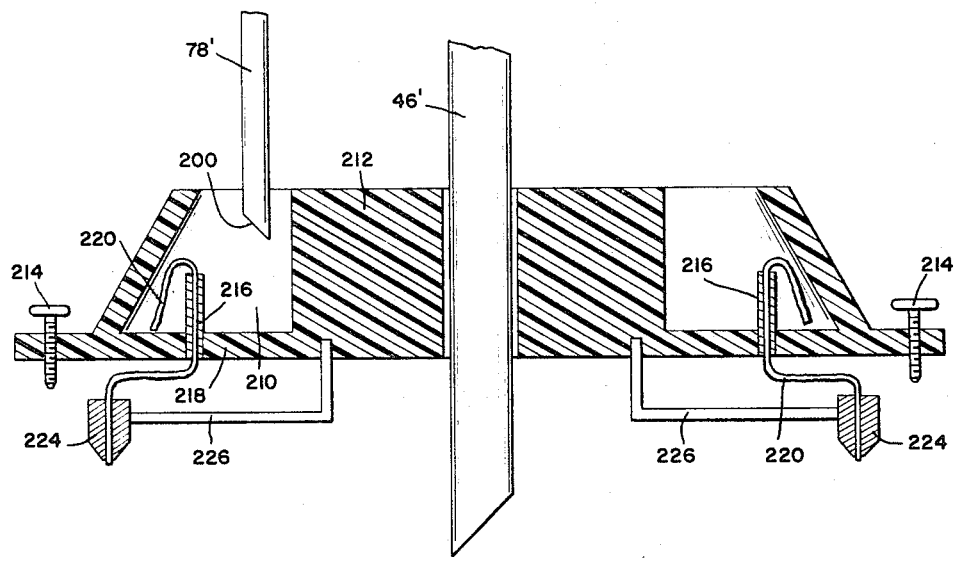
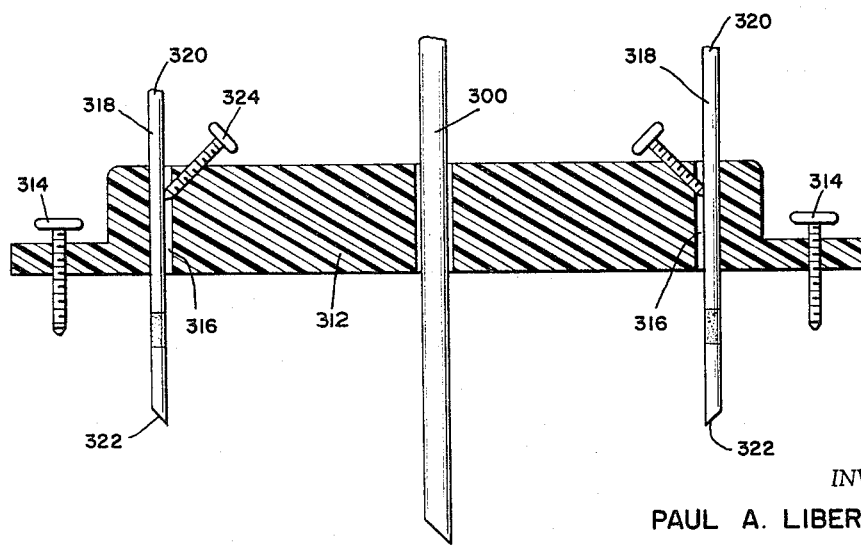

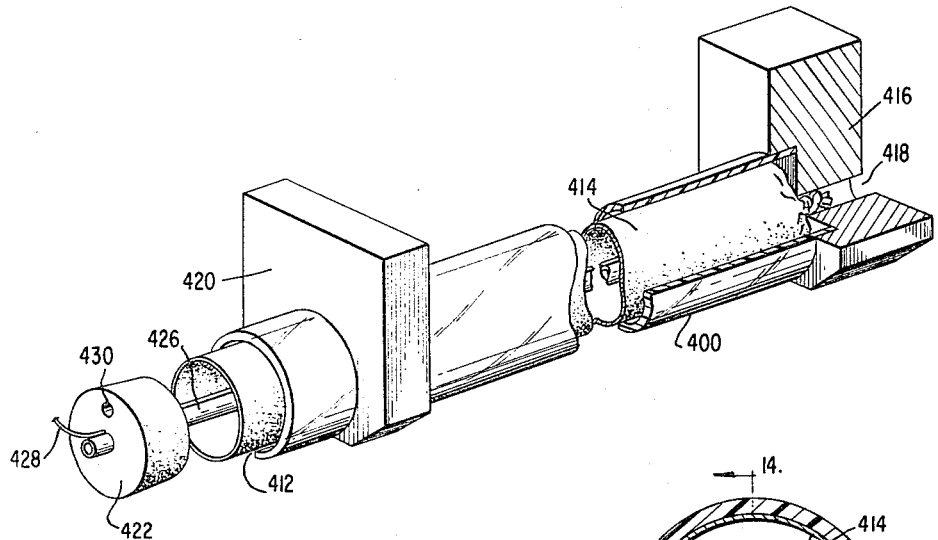
FIG.12
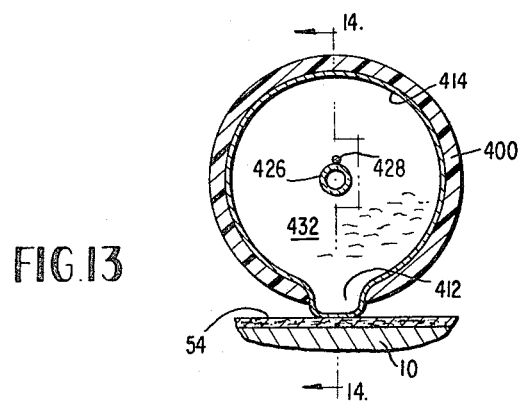
FIG.13
FIG.14
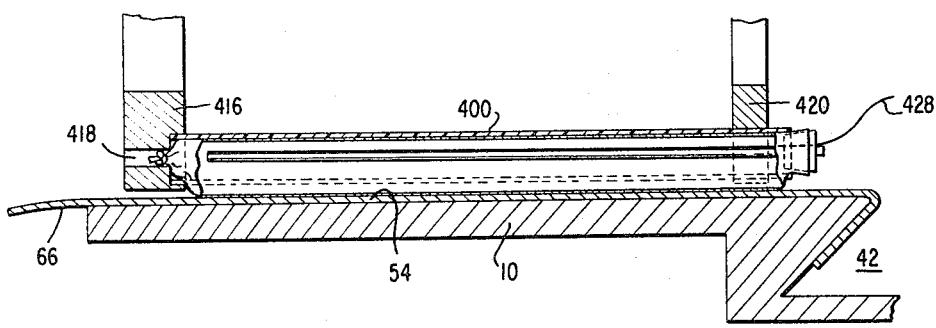

July 30, 1968 P. A. LIBERTI 3,395,093
CENTRIFUGAL CHROMATOGRAPHY AND ELECTROPHORESIS DEVICE
Filed Sept. 27, 1967 6 Sheets-Sheet 6
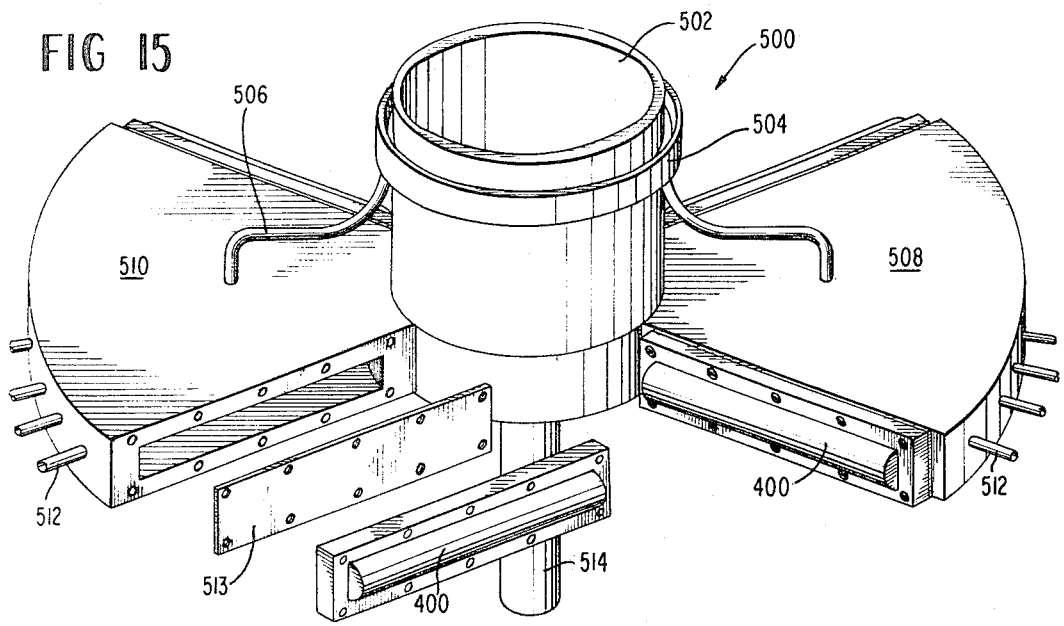
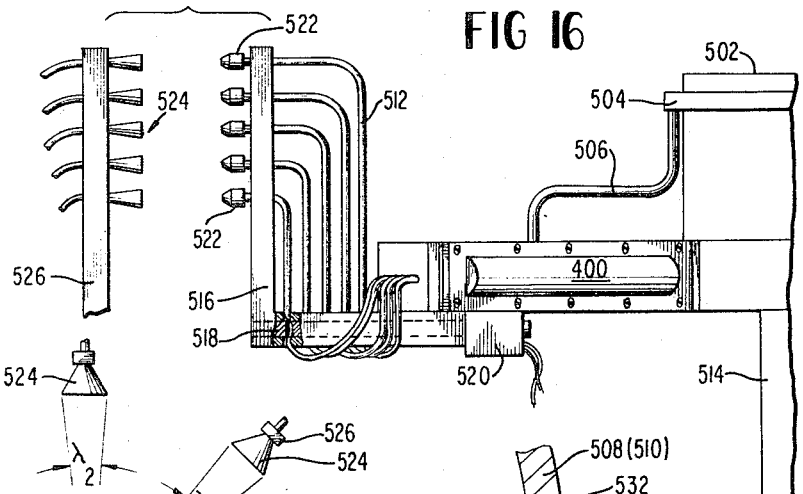
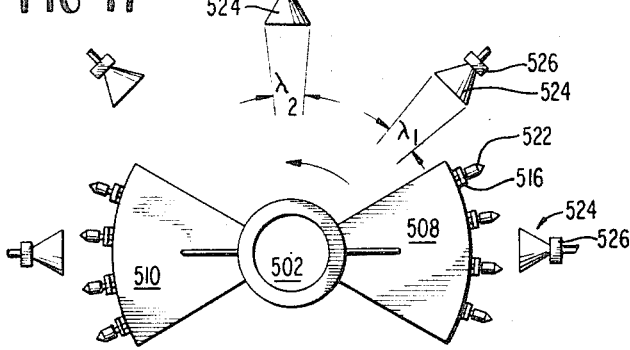
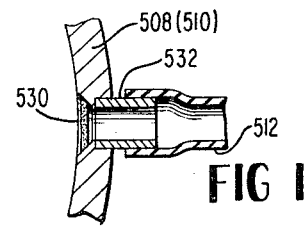
INVENTOR
PAUL A. LIBERTI
BY Stowell & Stowell
ATTORNEYS

United States Patent Office 3,395,093
Patented July 30, 1968

3,395,093
CENTRIFUGAL CHROMATOGRAPHY AND ELECTROPHORESIS DEVICE
Paul A. Liberti, Trevose, Pa., assignor to Research Corporation, New York, N.Y., a non-profit corporation of New York
Continuation-in-part of application Ser. No. 419,302, Dec. 18, 1964. This application Sept. 27, 1967, Ser. No. 674,081
22 Claims. (Cl. 204—301)

ABSTRACT OF THE DISCLOSURE

An electrophoresis chromatography device which rotates, thereby subjecting the various components to both centrifugal and electric force fields. In one embodiment the unknown solution flows over an adsorbent sheet, while in another it flows through a gel.

---

This is a continuation-in-part of my earlier filed patent application, Ser. No. 419,302, filed Dec. 18, 1964, now abandoned, entitled Centrifugal Chromatography and Electrophoresis Device.

The present invention relates in general to chromatography devices. Chromatography is known in the chemical arts as a separating of closely related compounds by allowing a solution of them to seep through an adsorbent so that the different compounds become adsorbed in separate colored layers comprising a chromatogram.

The present invention contemplates a separation procedure which utilizes an adsorption member such as filter paper in combination with a centrifugal force field whereby the compounds to be separated are initially deposited centrally of such adsorption member and thereafter seep or migrate outwardly at a particular characteristic rate.

While this invention relates to the aforesaid centrifugal chromatography method and includes a novel method and means whereby the solvent buffer solution which is used to wet the adsorption member may be conveniently applied, it further includes an apparatus for obtaining electrophoretic chromatograms or separations of complex migratory chemical compositions or substances.

Electrophoresis is defined as a movement of colloidal particles produced by the application of an electric potential. The migration of ions is effected by an electric field which is developed between two spaced electrodes to which direct current potentials are applied. It is a separation procedure based on migration of electrically charged fractions. The variously charged components of the substance under examination migrate or drift toward the respective electrodes of opposite charge. The separation action will take place on a sheet of adsorbent material such as, for example, filter paper which is wetted with a buffer solution. Each separable component of the substance travels on the sheet at a different characteristic rate and is subject, at the proper time, to qualitative and/or quantitative analysis.

Thus, in one aspect, the present invention relates to electrophoresis and, more particularly, to an improved method and apparatus for obtaining electrophoretic separations of migratory substances In another aspect, the invention relates to methods and apparatus for separating and collecting desired individual fractions of such substances. The present invention further contemplates a separation procedure which involves the use of a centrifugal field in combination with the electric field, such two fields cooperating to provide these separations.

By properly controlling the centrifugal field force, the electric field force, or a combination of the two forces, the method and apparatus of the invention are characterized by extreme flexibility in terms of substances which may be fractionated and in terms of the speed with which separations may be made. Control over the two force fields is possible over a wide range with the result that optimum fields may be used for any particular substance to achieve desired migratory paths. The separation effects of the combined force fields are particularly useful in determining and/or collection of blood serum fractions, and in the separation and/or collection of proteins, amino acids, nucleic acids, polypeptides, and other biological materials. The invention has wide use as a medical diagnostic instrument.

One object of the invention is to provide a solvent feed system for use with centrifugal chromatographic separation apparatus which provides closely controlled and very low solvent feed rates.

A further object of the invention is to provide radial electrode assemblies for centrifugal chromatographic separation apparatus whereby a combination of electrophoretic and centrifugal force fields acting normal to one another are established to produce rapid and distinct separation of the various fractions of complex chemical substance.

Another, and more specific object of the invention, is to provide a non-metallic electrode assembly utilizing a conductive electrolyte together with wicking conductivity bridges to avoid undesired electrode reactions with the filter paper of an electrophoretic separation apparatus.

Other objects, advantages, principles and details of the invention will be apparent from the following description which, together with the accompanying drawings, illustrate preferred embodiments. Such a detailed description is given by way of example only, and it is to be understood that the present invention is to be limited in scope only by the claims.

In the accompanying drawings:

FIG. 1 is a perspective view of the apparatus embodying this invention, together with a portion of a table upon which the same may be mounted for use; a portion of the apparatus has been cut away to better show the interior;

FIG. 2 is a fragmentary perspective view showing a portion of the apparatus illustrated in FIG. 1;

FIG. 3 is a plan view, to a slightly enlarged scale, showing the electric field electrodes, the filter paper, and sample collection means in greater detail than that provided by FIGS. 1 and 2;

FIG. 4 is a front elevation view, partially in section, and to a still greater enlarged scale, of major portions of the apparatus illustrated in FIG. 1;

Figure 7:
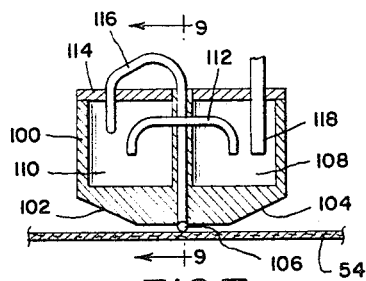
FIGS. 7, 8 and 9 are drawn to a greatly enlarged scale, and illustrate details of one of the electrodes.
Figure 9:
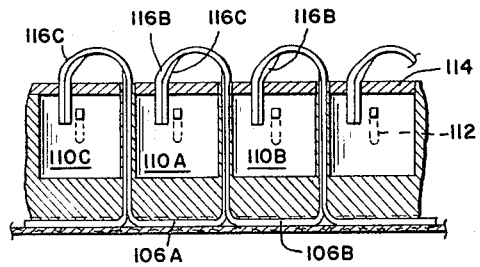
Figure 8:
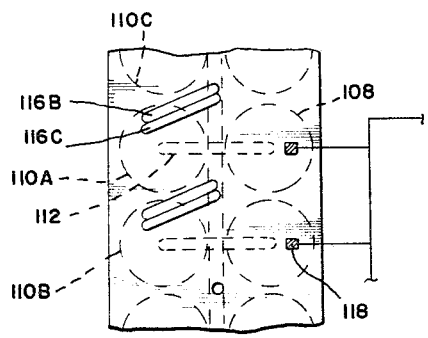

FIG. 8 being a fragmentary top or plan view;
FIG. 9 being a side elevation in section;
FIG. 7 being an end elevation in section;

FIG. 10 is a fragmentary, partial sectional view of a modified form of continuous feed means for the apparatus of the invention;

FIG. 11 is a fragmentary, partial sectional view of a modified form of feed means for spotting a solution on the adsorbent material and which is particularly useful in the preparation of electrochromatograms;

FIG. 12 is a partially broken perspective of an embodiment of an electrode;

FIG. 13 is a transverse cross-section of the electrode of FIG. 12;

FIG. 14 is a view taken along line 14—14 of FIG. 13;

FIG. 15 is a partially exploded perspective view of another embodiment of the entire apparatus and which employs the electrode of FIG. 12;

FIG. 16 is a partial elevational view of the apparatus of FIG. 15;

FIG. 17 is a partially schematic plan view of the modification of FIG. 15; and

FIG. 18 is a cross-sectional detail of the apparatus of FIG. 15.

FIG. 1 shows the general arrangement of the apparatus for carrying out the invention, certain details of which are more fully shown in FIGS. 2–4. A circular flat table 10 is mounted for rotation upon bearing means illustrated generally at 12. A housing 14 includes a circular base element 16 of greater diameter than that of the flat table; an annular wall element 18 secured in an upright relation to the base 16 by any convenient means, such as illustrated by the bolt 20; and a top cover element 22 releasably secured to the upper edge of the wall member by means of the quick-release fasteners 24. The entire housing assembly 14 rotates and carries with it the flat circular table 10.

As evident in the cut-away portion shown in FIG. 4, the assembly is supported by a base housing 26. Housing 26 includes a drive motor 28 and main shaft 30 of the apparatus. By means of the pulleys 32 and 34 and the intervening belt 36, a suitable rotation speed of between 200 to 800 r.p.m. or higher may be provided. The base housing 26 is of a suitable design to support the entire apparatus upon the top of the laboratory table 38, and while ordinary design procedure would dictate that the rotational elements be properly balanced to avoid excessive vibration, it may be advisable to include an intervening support plate 40 of larger area than the housing 26 in order to distribute the forces and reduce rotational vibration to a minimum.

The flat circular table 10 includes a central well 42 into which the solvent for the centrifugal chromatography is fed. The feed of the solvent to well 42 may be of any convenient means, for example, as illustrated by the solvent flask 44 which is connected to a solvent feed pipe 46 that is supported over the well openings by means of a conventional laboratory stand 48. Intervening tubing 50 connects the solvent flask with the feed pipe and the desired amount of solvent may be transferred to well 42 by the application of air to the flask port 52.

A circular sheet or disc of filter paper or other suitable adsorbent material 54 is mounted for rotation upon table 10. This is the first step in the preparation of the apparatus, and to carry this out the top 22 is removed, together with the plurality of electrodes which are generally designated as assemblies 56 and 58 in FIGURE 4. Such electrode assemblies will be described in greater detail hereinafter. Electrode assemblies 56 and 58 are releasably secured to the table 10 by means of fastener elements 60. The circular disc of adsorbent material 54 is provided with cut-outs to permit the passage of the electrode fastening means 60, and is further provided with a central opening 62 which is cut in such a manner to provide a plurality of serrated edges or points 64. The disc 54 is further provided with a plurality of V-shaped projections 66 at its outer periphery for a purpose to be described hereinafter.

As will be apparent from a study of FIGS. 1, 4 and 5, the buffer solution or solvent is transferred from the flask 44 through the supply tube 46 into well 42 in an amount sufficient to bring the level of solvent in the well up to a point somewhat below the downwardly and outwardly projecting points 64 of the disc 54. Upon rotation of the table 10 centrifugal force will cause the solvent to rise up across the surface 64. In this manner solvent is drawn up out of the well and flows under the action of capillary attraction and centrifugal force evenly out across the surface of the adsorbent material. Solvent from the flask 44 may be fed continuously or intermittently into the solvent well so as to provide a constant level of solution in the well. The distribution rate of the solvent across the filter paper disc may be varied by, for example, changing the liquid level in the well. By means of this solvent feed system extremely even distribution over the separation area of the disc of adsorbent material is achieved.

Figure 5:
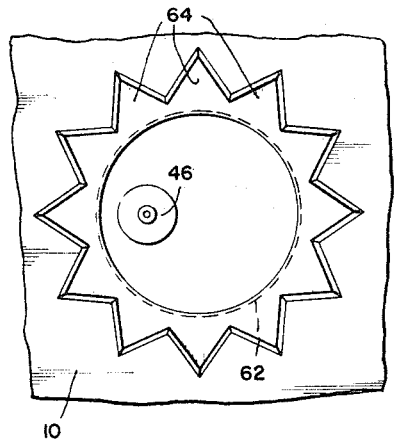
FIG. 5 is an enlarged detailed view taken along the section line 5—5 of FIG. 4.

The fragmentary sectional view of FIG. 5 is arranged so that the observer is looking upward in FIG. 4. The serrated central points 64 of the filter paper disc which dip into the well 42 are clearly visible, as is the supply tube 46 and the inner central opening 62 of the disc. In FIG. 5 it is assumed that the device is at rest and that the table 10 is not rotating, so that the solvent in the well 42 would not have risen to touch the serrations 64. However, in FIG. 4, the apparatus is rotating so that the solvent will rise up against the serrations as indicated by the dashed line within solvent well 42.

Figure 6:
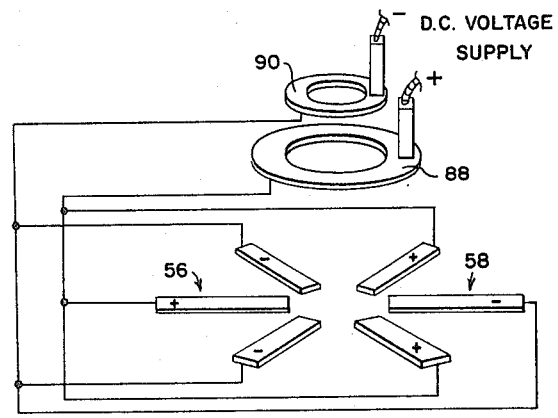
FIG. 6 is a perspective view, to an enlarged scale, which follows FIGS. 1 and 2 and provides details of the means for supplying the electric force field.

A plurality of radial electrode assemblies 56 and 58 are provided. As illustrated in the drawings, in one embodiment of the invention, six such electrode assemblies have been utilized. In actual practice, any convenient number of electrode pairs may be chosen so as to produce the desired electric force field. Alternate ones of the electrodes are connected to one terminal of the DC voltage supply while the intervening electrodes are connected to the other terminal of such supply. In the drawings, this is shown in FIG. 6 wherein each of the electrode assemblies 56 is connected to the positive voltage terminal while each of the assemblies 58 is connected to the negative terminal. Such connection is made by means of a slip-ring arrangement incorporated in the top cover element 22 in a manner which will be described hereinafter.

The plurality of electrode assemblies are positioned on top of the filter paper disc and retained by the elements 60 so that the electrodes remain in contact with the filter paper at all times and rotate with it. The energized electrodes set up a potential gradient between each two of a pair in a manner which is generally illustrated by the interrupted lines 74 which have been drawn in one of the sextants in the top view of FIG. 3. This potential gradient across the electric force field acts to separate component materials according to their ionic potential.

A sample of the material to be separated and collected is introduced between each pair of electrodes at a position 84 which is slightly nearer the center of the rotating assembly than the inner end of the electrodes, as is evident from the showing in FIGS. 2–4. A sample flask 76 is provided which is connected to a sample feed pipe 78 that is supported over the filter paper disc by means of a conventional laboratory stand 48. Intervening tubing 80 connects the sample flask with its feed pipe, and the sample may be transferred by the application of air to the flask port 82.

As best illustrated in FIGS. 2 and 3, under the action of the centrifugal force field the sample components are eluted by the solvent flowing radially over the filter paper and are carried to the outer edge where they are collected in test tubes or similar cup assemblies. As shown in greater detail in FIG. 4, a series of holes are provided in the vertical wall 18, and each such hole may be provided with a suitable bushing member 72 of plastic or resilient material to releasably engage a test tube 68. Each test tube is located so as to lie adjacent one of the protruding points 66 of the filter paper. The various fractions of the sample will collect as indicated by the quantity 70 shown in the test tubes 68. In addition to the centrifugal force field, the sample components are acted upon by an electrophoretic force field when the electrode assemblies are energized. Therefore, the sample components or fractions, according to their ionic potential, approach one or the other of the pair of radial electrodes as shown by the curved trajectories 86 illustrated in the lower full sextant view in FIG. 3. Due to the combination of centrifugal and electrophoretic forces, different fractions of the sample may be collected from each of the points in the test tubes 68 which are in alignment with these points, and which rotate together with the table 10 and filter paper disc 54.

Although the test tubes 68 have been illustrated as being fixed in an angular relation within the wall member 18, other known collection means may be utilized. For example, a hinged test tube or collection cup may be suitably mounted on the wall member 18 so that it may swing to assume a nearly horizontal position under the centrifugal action of rotation and then may return to a vertical position when the device is stopped. Such a swing-mounted collection cup is conventional in other centrifuging devices, and the particular sample collection means utilized is not considered to be an essential part of the invention.

Regarding the electrode assemblies and the method of supplying a direct current voltage to them in greater detail, in FIG. 4 and FIG. 1 it will be seen that the top member 22 is formed of an insulating material and carries on its surface two annular slip-rings 88 and 90. Spring-loaded brush assemblies 92 and 94 are supported in any convenient manner adjacent the top or upper surface of top member 22. Such brush assemblies are shown in detail in FIG. 4, but are shown only schematically in FIG. 1. It will be understood that such brush assemblies must be removably mounted adjacent the top member 22 so that access may be had to the assembly in order to replace the filter paper element 54 and the fraction collection tubes 68. One suitable and convenient method of securing the upper brush assemblies is to support them from the horizontal members of the laboratory stands 48.

The radial electrodes are an essential feature of the invention, and are an advance over parallel electrodes used in earlier art devices. Due to the use of radial electrodes, the electrophoretic force is highest near the point of sample introduction as indicated by the interrupted field lines 74 in FIG. 3, and the ratio of electrophoretic to centrifugal force varies over the radius over the filter paper. This provides the desirable attribute of having most of the separation take place near the center of the disc, thus allowing the radial quality of the centrifugal field to play an essential role in the separation, and also provides that the two force fields are always acting at right angles to one another; because the electrical lines of force are curved between the pairs of electrodes, a back vector is produced which provides for a greater separation effect.

As is evident from the electrical perspective schematic view of FIG. 6, the inner slip-ring 90 may be connected to the negative terminal of a DC voltage supply (not shown) and the outer or larger radius slip-ring 88 may be electrically connected to the positive terminal of such supply. The potential of the DC voltage supply may be adjusted so as to provide any desired gradient between the pairs of radial electrodes, as required to separate the components of a sample according to their ionic potentials.

In one embodiment of the invention, the diameter of the revolving table 10 was about thirty inches; the speed of revolution was variable from about 200 to 800 revolutions per minute; and six electrodes were used. For a desired voltage gradient near the point of introduction of the sample of about thirty volts per centimeter, an overall DC voltage of about 150 volts was used.

Each of the radial electrode assemblies 56 or 58 is designed in such a manner that no electrode reactions may take place in contact with the disc 54 and thereby contaminate the fractions of the sample under test due to any reaction products between the electrode and the disc. This is accomplished by forming the electrode assemblies shown in FIGS. 7-9 from a non-reactive material which also possesses high dielectric and resistivity properties. For example, Plexiglas; Lucite; an irradiated polyethylene; or other suitable plastic material may be used. An electrode assembly is prepared by machining or otherwise contouring a rectangular block of such a plastic material to the shape illustrated in FIG. 7. In such figure, it will be seen that the block of plastic 100 has been beveled or chamfered at its lower surfaces 102 and 104 which overlie the adsorbent disc 54 so as to provide a minimum electrode area which might accidentally contact the disc, and to permit a maximum area of the adsorbent material over which the sample fractions may migrate. The ends of the plastic block 100 are squared off and fashioned so as to receive the angle mounting members 96 which, in cooperation with the hold-down elements 60, releasably secure the electrode assembly to the surface of the filter paper. The angles 96 may be formed of a similar non-reactive plastic material, or may be machined from the end surfaces of the rectangular plastic bar 100. It is important to note that the angles 96 are located at the ends of the plastic rectangular bar 100 at a position which will hold the entire rectangular electrode just clear of the surface of the filter paper 54 as shown in FIG. 7. In this manner, the only actual physical and electrical contact between the electrodes and the adsorbent material is made through wick portions 106 which lie along the bottom surface of the electrodes.

A series of pairs of holes or cells are formed in the upper surface of the electrode by boring the upper surface. As shown in FIG. 8, each cell of a pair lies slightly to one side of the longitudinal center line of the electrode. Each pair of cells 108 and 110 is interconnected by a small internal channel or port through which a cotton string 112 is inserted to serve as a wick. Each of the cells 108 and 110 is completely filled with an electrolyte which, in most cases, consists of a buffered solution of a control or reference material having a known pH value. After filling the cells with the electrolyte a top element 114 is secured to the electrode body 100 so as to prevent the electrolyte solution from splashing when the apparatus is rotated. This top or cover member 114 is bored along the center line of the electrode in a series of vertical holes which will accept additional cotton string wick elements 116.

The wick connections 116 are serpentine in shape and as is illustrated each cell 110 accepts two wick elements 116. Thus, referring to FIG. 9, from the cell 110A a wick 116B extends upwardly through the cover 114 in a direction to the right and then downwardly through the central bore and thence to the right to provide the portion 106B underlying cell 110B. The same wick extends upwardly along the bore adjacent the right-hand side of cell 110B through the top or cover 114 and then bends to the left and down through the cover again into cell 110B. From cell 110A a second wick 116C extends upwardly through the cover, then down through the same bore as first mentioned, thence in a direction to the left to underlie cell 110A and provide a portion 106A. This second wick then turns upwardly into the bore which separates cell 110C from 110A and then is curved to the left to pass through the top or cover member 114 and down into cell 110C. It is in this manner that the wick portions 106 provide the only electrical and physical contact between the electrode assembly and the filter paper disc 54.

In order to supply the direct current potential to the electrode assembly, each cell 108 in the plastic bar 100 includes a platinum electrode 118 which extends upwardly through the cover 114. The electrodes 118 are joined together electrically into a single longitudinal bus bar 120. To such bus bar is attached a heavy electrical conductor in a position so that it will underlie the proper slip-ring 88 or 90 in accordance with the polarity of the particular electrode assembly.

Member 122 is shown secured to the bus bar 120 of the electrode assembly 58. It is sufficiently rigid to support the spring-loaded brush contact element 126 beneath the slip-ring 90. In a similar manner the conductor 124 supports the spring-loaded brush contact assembly 128 under the slip-ring 88. The conductor and support members 122 and 124 thus conduct the direct current potential to the separate electrode assemblies. They are attached to the bus bar element 120 by any suitable means, for example, as indicated by the welded connection 130 in FIG. 4.

It should be noted that the plastic block 100 from which an electrode assembly is fashioned may be of considerable size. In the embodiment utilizing a table 10 of thirty-inch diameter, the electrode assemblies 56 and 58 were almost twelve inches in length, and each contained nine pairs of cells 108 and 110. Thus there is provided sufficient electrode mass to absorb any heat build-up due to reactions which take place when the DC potentials are applied. Fractionation runs of up to four hours have been made without undue heating. In most fractionations, however, much shorter runs would be sufficient; for example, blood serum fractions can be separated quite readily within about twenty minutes.

The top cover element 22 has a further function other than providing the means to supply the direct current potentials to the radial electrode assemblies. Top 22, together with wall element 18 and the base 16, comprise the housing assembly 14. Such housing not only prevents any splattering or splashing of the sample components onto the laboratory table and equipment, but also provides an enclosure which reduces evaporation of the solvent; although for such latter purpose housing 14 need not be completely air-tight.

Another form of continuous feed means for the apparatus is illustrated in FIG. 10 of the drawings. Referring to FIG. 10, wherein structures corresponding to those illustrated in FIGS. 1 through 6 are provided with primed reference characters, the solvent feed to the well, now shown, is through central feed pipe 46′. Feed of the sample from a supply such as flask 44 of FIG. 1 into the device is through feed pipe 78′. The end 200 of pipe 78′ discharges the sample into an annular trough 210 formed in member 212 adapted to rotate with the rotating elements of the assembly shown in, for example, FIG. 1. The member 212 may, for example, be secured to the inner edge of the electrode 58 (FIG. 4 of the drawings) by mounting screws 214.

The annular channel 210 is provided with a plurality of stand pipes 216, the lower end of each passing through the base 218 of member 212. Each stand pipe 216 has a wick 220 passing therethrough. One end of each wick is in contact with the sample contained in the channel 210 while the other end of each wick passes through a wick guide 224. Each wick guide 224 is supported by a resilient spring-like holder 226 whereby the lower ends of the wicks 220 are in contact with the adsorbent material as the entire assembly rotates as discussed in reference to the prior form of the continuous feed means.

When it is desired to obtain qualitative electrophoretic and chromatographic information concerning a substance or substances under study, a pattern or electrochromatogram can be produced by spotting, for example, five-ten microliters of, for example, an eight percent solution of a sample at the origin (point 84, FIG. 3 of the drawings) of a 60° segment which is at equilibrium with the eluting solvent. The device is then rotated until the substance with the greatest chromatographic migration rate approaches the vicinity of a drip-point of the device. This condition is determined by prior trial. The adsorbent material is then removed and stained, such that the trajectory of each migrating substance becomes visible. The electrochromatogram so produced affords a criterion for purity in many cases, a method of determining quantitative dispersity of a polydispersed sample and, most importantly, a means of determining chemical changes in one or more components of a mixture relative to the unaltered mixture. The significance of the last application lies in the fact that changes in electrophoresis patterns of human blood serum are very closely related to disease.

A suitable apparatus for spotting the sample on the disc 54 is illustrated in FIG. 11 of the drawings. Referring to FIG. 11, pipe 300 delivers the solvent to the well 42 (FIG. 4 of the drawings) and member 312 rotates about the feed pipe. Member 312, like member 212 of the form of the invention shown in FIG. 10, may be secured to electrode 58 by screws 314. The member 312 is provided with, for example, six bores 316 corresponding with the six origins 84 shown in, for example, FIG. 3 of the drawings and each bore receives a capillary tube 318. The capillary tubes 318 have closed upper ends 320 and beveled lower ends 322. Set screws 324 hold the tubes 318 in the member 312. In operation the capillary tubes, prior to insertion in member 312, are dipped into a container of the sample and a slug is drawn into the center of each capillary tube. Each tube 318 is then sealed at its upper end and the tubes are placed in member 312. The device is rotated and when the system reaches a steady state or equilibrium condition the tops of the capillary tubes are broken, without stopping the apparatus. With the tops broken the sample in each tube flows onto the adsorbent material.

Various modifications and changes in detail may be made in carrying out the invention; as well be apparent to those skilled in the art. For example, in order to reduce the possibility of contamination of the buffer solution, a stainless steel lining may be provided for the solvent well 42. Also, the circular table 10 may be constructed in a manner which permits the removal of such a solvent well lining for cleaning or substitution.

Turning now to the embodiment illustrated at FIGURES 12 and 13 of the drawings, a novel electrode configuration is illustrated, this configuration not requiring the plurality of components described in the earlier electrode embodiment. According to this electrode embodiment, an elongated and continuous electrode is defined by an elongated tube 400 provided with a longitudinally extending slot 412. The tube 400 may be formed of plastic as for example, Lucite, and the width of the slot 412 may be approximately ¼″. The numeral 414 denotes a dialysis membrane tubing formed of any conventional dialysis material and closed at one end by tying the tube and material upon itself. A supporting bracket 416 is provided with a recessed or counter-sunk portion to receive the tube 400 and is also provided with an aperture 418 through which the tied end of the dialysis tube 414 extends. Another mounting bracket 420 supports the other end of the tube 400 and it will here be observed that this latter bracket does not extend to the very end of the tube. A rubber stopper 422 is provided with a central through opening for the reception of an elongated glass supporting element 426. A platinum wire 428 runs parallel and supported on the glass rod 426. A vent hole 430 may also be provided in the rubber stopper.

A buffer solution 432 is placed within the assembly and, as may be seen from FIGURE 13 of the drawings, a portion of the dialysis membrane which forms the tubing extends through the slot 412 and radially outwardly of the external surface of the tube 410.

FIGURE 14 of the drawings illustrates this embodiment of the electrode as applied to the main device. Comparison of FIGURE 14 with FIGURE 4 will immediately show the similarity. The alternate polarities and connections between the platinum wires 428 extending through the rubber stoppers 422 are entirely similar to the electrical connections illustrated at FIGURE 6 of the drawings. It will be noted that the mounting brackets 416 and 420 are secured to the top cover 22, although the complete upward extent of these brackets is not shown for purposes of illustration.

FIGURES 15, 16 and 17 represent a still further modification of the invention and according to the embodiment illustrated here electrophoresis takes place with the liquids to be separated passing through a gel medium, in distinction to the previously described embodiment wherein separation occurs over a planar surface. In this embodiment, in place of a sheet type supporting medium, separation takes place through a thickness of gel much as it would through a horizontally accelerated column. On either side of the gel medium are fixed membrane electrodes, such as illustrated at FIGURE 12, which which are positioned against an additional membrane whose function is to enclose the gel within a wedge shaped chamber.

Turning now to FIGURE 15 of the drawings, the numeral 500 denotes generally another embodiment, the top portion of which includes a cylindrical element having a cavity 502 therein. Exteriorly of the cylinder and mounted on its upper outer wall is a circular gutter 504 from which depend two tubes 506 extending to the angular and radial mid-points of wedge shaped gel chambers 508 and 510. The chambers are identical in construction and each occupies an angular extent of approximately 60 degrees. As seen from the exploded left construction 510, the gel chambers are constructed of top and bottom parallel portions to define an annular, wedge shaped cavity within each section 508, 510. The radially innermost portion of each wedge is in fluid communication with cavity 502, which contains an eluting solvent continuously replaced during operation by any convenient means, such as flask 44 of FIG. 1. The elements so far described are mounted on rotatable shaft 514.

A plurality of tubes 512 extend radially outwardly from the outer rim periphery of each wedge 508, 510 and are spaced generally uniformly therealong. As illustrated at the exploded portion of FIGURE 15, the sides of each wedge element are enclosed by a membrane 513 similar to membrane 414 of FIGURE 12 to retain the gel within each wedge cavity. After the membranes 513 have been placed over the radially extending edges of the wedge cavities, an electrode 400, such as that shown in the embodiments illustrated at FIGURES 12, 13 and 14, is fixedly secured to the edges of each wedge section, as illustrated at the right hand portion of FIGURE 15 with respect to the wedge 508.

Turning now to FIGURE 16, each angularly spaced tube 512 passes first through a transverse aperture in the lower, hollow leg of L-shaped bracket 516. A transversely apertured and elongated plunger 518 reciprocates in this lower leg, actuated by solenoid 520. In the illustrated position of plunger 518, fluid may pass through each flexible tube 512. In its other solenoid-actuated position, the plunger squeezes each tube 512 to preclude fluid passage therethrough. Brackets 516 are provided on each wedge 508, 510 and each tube 512 then extends upwardly and is affixed to a nozzle 522, the nozzles being vertically spaced from each other and carried by the other leg of bracket 516.

A stationary bank of funnels 524 is mounted on bracket 526, the latter suitably supported in fixed relation to the rotatable shaft 514. Each of the funnels in bank 524 is horizontally aligned with one of the nozzles 522, so that each nozzle of bank 524 receives liquid exuded from its counterpart (corresponding) nozzle 522.

As illustrated at FIGURE 17, each outer rim periphery of 508, 510 is provided with, for example, four brackets 516 to thereby yield a total of eight banks of nozzles 522, with five nozzles in each bank. Stationary brackets 526 which carry the receiving funnel banks 524 are equally angularly distributed in rather close radial proximity to the nozzles 522. Further, as indicated at FIGURES 16 and 17, each of the funnels of the banks 524 is coupled to a suitable chamber or test tube for subsequent analysis.

In the operation of the embodiment illustrated at FIGURES 16, 17 and 18, fluid solvent is placed in the cavity 502 and rotation of shaft 514 is effected by any suitable means, not illustrated. Under the action of centrifugal force attendant the rotation, the solvent in reservoir 502 flows into the radially innermost portions of the wedges 508, 510 and passes through the gel placed in the cavity of each of these wedges. The unknown mixture whose components are to be separated is placed in gutter 504 and flows outwardly therefrom under the influence of centrifugal force into the tubes 506. The unknown mixture is separated under the action of centrifugal and electrophoretic forces, previously described with respect to the embodiment of FIGURE 1, and the now angularly separated components of the unknown mixture pass through the tubes 512. During the rotation of shaft 514, except for specific angular positions of the wedges 508, 510, the (illustrated) solenoid 520 constantly squeezes the tubes 512 of a particular bracket 516 so as to preclude the release, under centrifugal force, of liquid in each tube from its corresponding nozzle 522.

Referring now specifically to FIGURE 17 of the drawings, when the leading bank of nozzles 522 of wedge 508 enters the angular domain lambda$_1$, the solenoid 520 mounted on this particular bracket 516 is released to thereby permit the fluid passage through the nozzles 522. Accordingly, a slug of liquid will be released from each of the nozzles 522 into its counterpart funnel of banks 524 mounted on bracket 526. Just before leaving the angular domain lambda$_1$, the solenoid 520 is actuated to again squeeze the tubes 512 so that further release of liquid from this particular bank will be precluded. Rotation of the wedge 508 continues and this leading bank of nozzles 522 on wedge 508 will not again release fluid into funnel bank 524 until 360° later, i.e., until the next time this bank enters the angular domain lambda$_1$. The reader will now be in a position to comprehend that the adjacent bank of nozzles 522 will exhaust its separated components upon reaching the angular domain lambda$_2$. Similarly, each of the banks 522 will empty its contents, in the form of separate liquid slugs, into corresponding receiving funnel banks 524 once during each complete revolution of wedges 508, 510. The receiving funnels in banks 524 are each connected to a suitable reservoir which may take the form of a test tube connected to each funnel.

FIGURE 18 of the drawings discloses a detail of the device shown in FIGURE 15. This detail shows the connection between the outer rim wall of one of the wedges 508, 510 and any of the tubes 512. A porous plug 530 is mounted on the interior wall of the peripheral rim across one of the apertures and a short thimble 532 is mounted in the peripheral wall and extends outwardly a short distance. Any of the tubes 512 are positioned over 532. The function of porous plug 530 is to preclude the loss of gel through the tubing 512 under the action of centrifugal force during the operation of the device.

It will be apparent that the number of wedges 508, 510 may be varied, as well as the angular extent of each wedge. It will further be apparent that the number of collecting tubes 512, as well as the number of receiving funnels in each bank 524 and the number of nozzles 522 in each of the corresponding banks may also be varied. The electrical connections which permit the actuation of the various solenoids 520 during selected angular positions of the wedges 508, 510 have not been illustrated and may assume the form of, for example, brush and collector arrangements well known and which form no part of this invention.

I claim:

1. A centrifugal electrophoresis apparatus comprising, in combination, an annular disc of adsorbent material, a rotatably mounted table to support said disc, a plurality of elongated electrodes having a longitudinal dimension less than the radial surface dimension of said disc, means to secure said electrodes to said table to overlie said disc in an angularly spaced symmetrical pattern with the longitudinal axis of each electrode radial of the disc, means to supply a voltage potential to said electrodes, and means to rotate said table.

2. A centrifugal electrophoresis apparatus according to claim 1 wherein said table includes a central solvent well of a diameter substantially equal to the inner diameter of said annular disc, solvent supply means positioned above said well, and sample supply means positioned above said disc at a point adjacent the inner circumferential edge thereof.

3. A centrifugal electrophoresis apparatus according to claim 1 wherein said table includes a central solvent well of a diameter substantially equal to the inner diameter of said annular disc, solvent supply means positioned above said well, and the inner circumferential edge of said disc extends downwardly into said well.

4. A centrifugal electrophoresis apparatus according to claim 3 wherein said inner circumferential edge of said disc is serrated to provide a plurality of extending projections.

5. A centrifugal electrophoresis apparatus according to claim 2 wherein the outer circumferential edge of said disc is serrated to provide a plurality of extending projections.

6. A centrifugal electrophoresis apparatus according to claim 5 further including a plurality of sample fraction collecting means mounted adjacent the projections of the outer circumferential edge of said disc, and rotatable with said table.

7. A solvent feed system for use with centrifugal chromatographic separation apparatus utilizing an annular adsorbent disc element; comprising, an open-topped inwardly sloping walled solvent container located adjacent the lower surface of said disc element and rotatable therewith, and means to supply said container with solvent to a predetermined level.

8. A method of feeding a solvent onto a rotatable annular adsorbent disc of a centrifugal chromatographic device comprising the steps of locating a supply of solvent at a predetermined level in a walled open container below said disc, extending the inner circumferential edge of said disc downwardly into said container adjacent the walls thereof a distance short of the solvent level, and rotating said container together with said disc at a speed such that centrifugal forces move the solvent up the container walls a distance which covers the extended edge of the disc.

9. A method according to claim 8 including the further step of transmitting the solvent radially outwardly of the disc by a combination of capillary attraction and centrifugal force.

10. Chemical separation and fractionation apparatus including, in combination, first separation means of the centrifugal force field type, second separation means of the electric force field type, and means to establish and maintain said force fields normal to one another, said second separation means comprising a radial electrode arrangement secured to a centrifugal chromatographic disc and rotatable therewith.

11. In a centrifugal electrophoresis separation apparatus, means to establish a potential gradient across the electric force field in a direction normal to the centrifugal force field of a magnitude which is greatest near the point of sample introduction, and which diminishes radially outwardly thereof; the ratio of electrophoretic to centrifugal force varying over the radial dimension of the separation medium.

12. Centrifugal electrophoresis separation apparatus according to claim 11 wherein said means to establish a potential gradient comprises a radial electrode arrangement secured to a centrifugal chromatographic disc separation medium and is rotated therewith.

13. An electrode assembly for use with continuous centrifugal electrophoresis apparatus utilizing an adsorbent disc separation element comprising a non-conductive electrode body, a plurality of cellular openings in said body for retaining a supply of conductive electrolyte, and wick members interconnecting said cellular openings conductively to one another and to said disc element; said wick members providing the only electrical and physical contact between the electrode assembly and the disc.

14. An electrode adapted for use with an electrophoresis apparatus, said electrode including a housing, said housing having an apertured wall portion, a dialysis membrane forming a closed chamber and positioned within said housing and adapted to be filled with a buffer solution, a part of said membrane adapted to extend through said apertured wall portion and to make contact with an adsorbent surface.

15. The electrode of claim 14 including an electrical conductor in communication with said closed membrane chamber.

16. The electrode of claim 15 wherein said housing is an elongated member, said apertured wall portion is an elongated slot, and said electrical conductor is a wire running longitudinally of said housing.

17. A centrifugal electrophoresis apparatus including a chamber, means for supporting said chamber about an axis of rotation, said chamber adapted to be filled with a gel, means for supplying a composition whose components are to be separated to said chamber, means for receiving angularly separated components of the composition, and angularly disposed electrodes for establishing an electric field at an angle to a radius across said chamber.

18. The apparatus of claim 17 wherein said electrodes are located along radially extending edges of said chamber.

19. The apparatus of claim 17 wherein said chamber is in the form of a wedge and is closed on each radially extending edge thereof by a dialysis membrane, and an electrode in contact with each said dialysis membrane.

20. The apparatus of claim 17 wherein said means for receiving angularly separated components of the composition includes a plurality of angularly displaced fluid conduits at the radially outermost end of said chamber, a plurality of receiving funnels stationary with respect to said axis of rotation, each of said funnels being radially aligned with each of said fluid conduits at an outer end of the latter, said funnels being radially spaced from the outer ends of said fluid conduits, said alignment occurring at predetermined angular positions of said chamber, and means for precluding passage of fluid from said fluid conduits into said funnels except at said predetermined angular positions of said chamber.

21. The apparatus of claim 17 including an eluting solvent reservoir in fluid communication with said chamber, solvent in the reservoir adapted to facilitate angular and radially outward movement of the components of a composition whose components are to be separated.

22. The apparatus of claim 17 wherein said means for receiving angularly separated components of the composition includes a plurality of angularly displaced fluid conduits at the radially outermost end of said chamber, said fluid conduits being in fluid communicaton with a plurality of vertically aligned nozzles, a plurality of receiving funnels stationary with respect to said axis of rotation, each of said funnels being radially aligned with each of said nozzles, said funnels being radially spaced from the said nozzles, said alignment occurring at predetermined angular positions of said chamber, and means for precluding passage of fluid from said nozzles into said funnels except at said predetermined angular positions of said chamber.

References Cited
UNITED STATES PATENTS

| | | | |
|---|---|---|---|
| 2,986,280 | 5/1961 | Magnuson et al. | 210—198 |
| 2,992,979 | 7/1961 | Magnuson et al. | 204—180 |
| 3,113,103 | 12/1963 | Lowery | 210—198 |

FOREIGN PATENTS

| | | |
|---|---|---|
| 956,016 | 4/1964 | Great Britain. |
| 1,010,604 | 11/1965 | Great Britain. |

JOHN H. MACK, *Primary Examiner.*

A. C. PRESCOTT, *Assistant Examiner.*